Patented Oct. 15, 1935

2,017,280

UNITED STATES PATENT OFFICE 2,017,280

GAS ELECTRODE FOR PRIMARY BATTERIES

George W. Heise, North Olmsted, and Erwin A. Schumacher, Lakewood, Ohio, assignors to National Carbon Company, Inc., a corporation of New York No Drawing. Application January 28, 1931, Serial No. 511,924

14 Claims. (Cl. 136—121)

In general this invention pertains to gas permeable carbon electrodes for primary batteries, and in particular to such an electrode rendered repellent to aqueous electrolyte.

Such electrodes are used, for example, in air-depolarized cells having zinc anodes, caustic alkali electrolyte, and gas permeable carbon cathodes, the latter partially immersed in aqueous electrolyte containing a caustic alkali such as caustic soda and extending to the outer atmosphere. To prevent undue absorption of electrolyte, the carbon electrodes are waterproofed, usually by impregnation with a material like paraffin or oil.

The penetration of electrolytes must be kept as low as possible, because it reduces the chemical activity or depolarizing ability of the electrode and consequently the output of the cell, especially on heavy drain. Therefore, one object of this invention is to provide a gas pervious electrode having a greater resistance to electrolyte penetration.

Whenever electrodes of this type are subjected to local high temperature, such as by partially immersing them in hot electrolyte, or sealing them into a battery, there is danger, when they are impregnated with oil or the like, of a drift of the water-proofing medium, which might permit undue penetration of electrolyte, and creepage, by capillary flow, through the electrode itself. Therefore, another object of this invention is to provide a water-proofing medium that will not creep when the electrode is heated. Other aims, objects, and novel features, will be apparent form the following description.

A gas electrode or battery cathode such as those known heretofore, usually comprises a carbonaceous material, and a binder, molded into blocks of suitable size and shape. These blocks may be waterproofed by impregnation with a solution of paraffin and carbon tetrachloride, and the solvent removed by heat. Our invention comprises such an electrode impregnated with a solution that renders it more resistant to electrolyte penetration.

We have found that rubber, due to its inertness to chemical attack and its resistance to solvent action, is especially desirable for use in such gas electrodes. We have also found that to attain best results such electrodes should preferably be impregnated with a solution containing rubber in a highly dispersed form. A suitable rubber solution of this type can be made by dissolving a good grade of crepe rubber in, say, twenty times its own weight of benzene or other suitable solvent. Then in preparing the impregnating solution we may use:

| | Volume |
|---|---|
| Benzene | 1,000 |
| Rubber solution | 400 |

The electrodes are immersed in this solution until saturated, then transferred to a suitable evaporator where the solvent may be removed rapidly. A heating period of 3 to 5 hours at a temperature of 120° C. has been found satisfactory. It is evident, of course, that the evaporation of the solvent may be accomplished in other ways without altering the character of the completed electrode. In electrodes impregnated in this manner the water-proofing solution will not creep or drift when the electrodes are heated.

We have found that commercially available solutions of rubber, rubber and asphalt and the like, such as those used for paint may be substituted for the benzine and rubber solution mentioned above. A paint containing about 17% rubber and having excellent water-proofing qualities is readily available. A suitable impregnating composition containing this paint consists of:

| | Volume |
|---|---|
| Benzene | 1,000 |
| Paint | 75 |

We have also found that even better results are obtained by the addition of a small quantity of one of the heavier unctuous petroleum products such as petroleum jelly, paraffin, or that known to the trade as "refined cylinder oil". A suitable impregnating solution containing oil which has proved successful consists of:

| | Volume |
|---|---|
| Benzene and rubber solution (as above) | 1,000 |
| Oil | 2.5 |

The exact function of the oil is not clearly known. It may be that it permits a higher degree of penetration of the waterproofing composition into the capillary or pore spaces, hence, a better, more nearly continuous coating of the carbon, or that the residual film is more electrolyte-repellent, or otherwise more suitable than one of rubber only.

As a result of a series of tests we have found that our improved electrode has a resistance to electrolyte penetration which may under certain conditions be one-half or even less than that of electrodes impregnated with wax or equivalent, and shows better heavy drain characteristics on long continued tests. It is evident, therefore, that we have made a decided improvement in gas electrodes for primary batteries.

In practicing this invention our improved gas electrodes may be prepared in other ways similar to that described, and various equivalent materials may be substituted for those specified without departing from the spirit of the invention or sacrificing any of the rights thereunder.

We claim:

1. A gas-permeable battery electrode comprising a molded block of porous carbonaceous material and a waterproofing of rubber.

2. A gas-permeable battery electrode comprising a molded block of gas-permeable carbon and a waterproofing of rubber.

3. A gas-permeable battery electrode comprising a molded block of carbon and a waterproofing of rubber and an unctuous petroleum product.

4. A gas-permeable battery electrode comprising a molded block of carbon and a waterproofing of rubber and a petroleum oil.

5. A gas-permeable battery electrode comprising a molded block of carbon and a waterproofing of rubber and petroleum oil in which the amount of rubber is greater than the amount of oil.

6. A gas-permeable carbon electrode rendered repellent to caustic alkali electrolyte by a waterproofing of rubber.

7. A gas-permeable carbon electrode rendered repellent to caustic soda electrolyte by a waterproofing of rubber.

8. A gas-permeable battery electrode comprising a porous block of molded carbon, and a coat of electrolyte-repellent material comprising rubber on said carbon.

9. A gas-permeable battery electrode comprising a porous block of molded carbon, and a coat of electrolyte-repellent material comprising rubber and a petroleum oil.

10. A chemically active, gas-permeable, battery electrode, comprising a porous block of molded carbon and a film of electrolyte-repellent material comprising rubber and a petroleum oil on the capillary and pore walls of said carbon.

11. A chemically active, gas-permeable, battery electrode, comprising a porous block of molded carbon and a film of electrolyte-repellent material comprising rubber and a petroleum oil on the capillary and pore walls of said carbon that will not creep or drift when said electrode is heated.

12. A chemically active, gas-permeable, battery electrode, comprising a porous block of molded carbon and a film of electrolyte-repellent material comprising rubber and a petroleum oil on the capillary and pore walls of said carbon wherein the amount of rubber is greater than the amount of petroleum oil.

13. A gas-permeable battery electrode comprising a porous block of carbon and a binder, and a film of electrolyte-repellent material comprising rubber on the capillary and pore walls of said carbon.

14. A gas-permeable battery electrode comprising a porous block of carbonaceous material, and a binder, and a film of electrolyte-repellent material comprising rubber and petroleum oil on the pore walls of said block and the capillary walls of said material.

GEORGE W. HEISE.
ERWIN A. SCHUMACHER.